March 10, 1931. K. PETER 1,796,045
REVOLVING VALVE FOR COMBUSTION ENGINES
Filed May 3, 1930
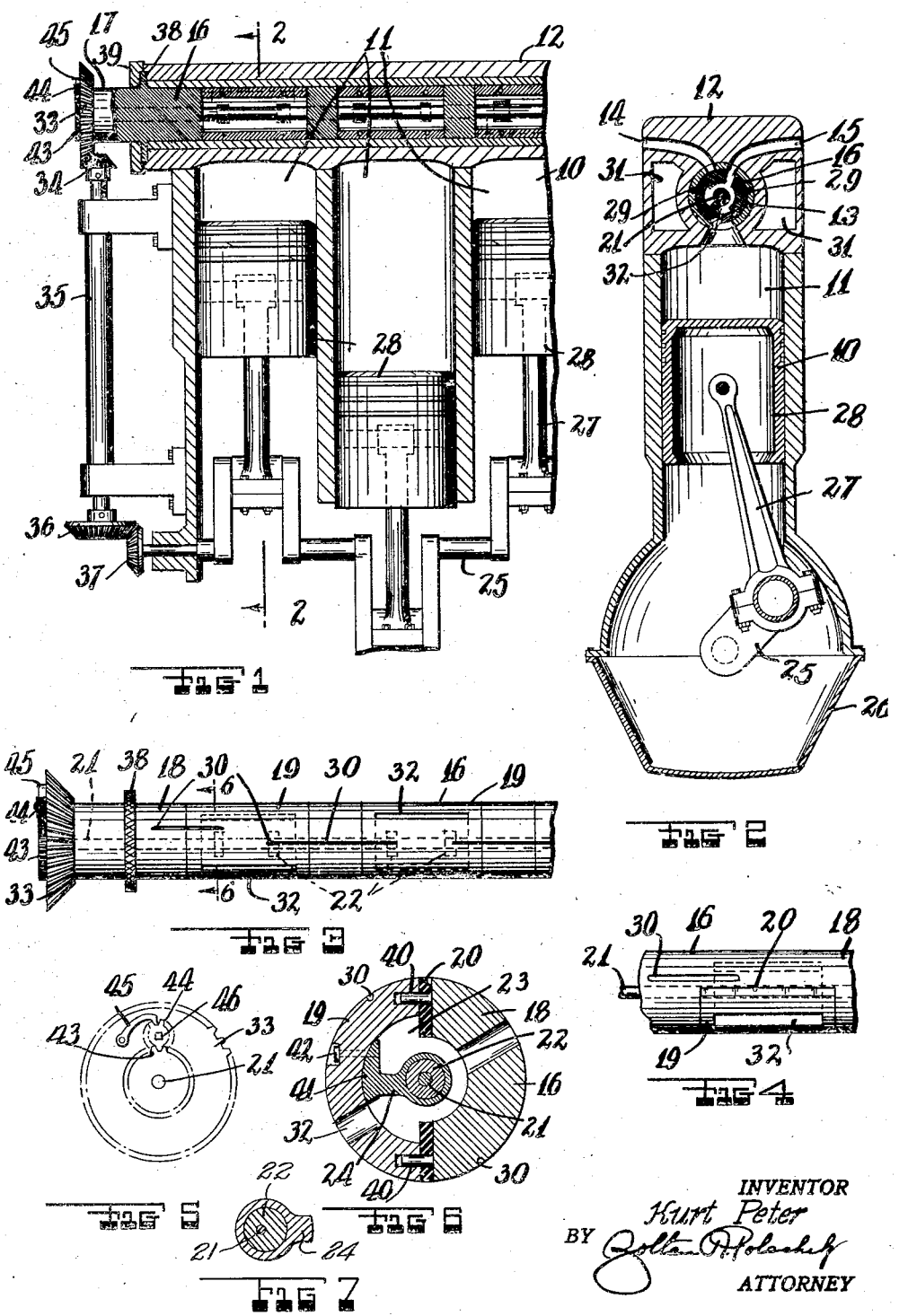
INVENTOR
Kurt Peter
BY
ATTORNEY Patented Mar. 10, 1931

1,796,045

UNITED STATES PATENT OFFICE.

KURT PETER, OF CLIFTON, NEW JERSEY

REVOLVING VALVE FOR COMBUSTION ENGINES

Application filed May 3, 1930. Serial No. 449,429.

This invention relates to new and useful improvements in a revolving valve for combustion engines.

The invention has for an object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a fragmentary vertical sectional view of a combustion engine provided with a valve constructed according to this invention.

Fig. 2 is a vertical sectional view taken on the line 2—2 of Fig. 1.

Fig. 3 is a fragmentary side elevational view of the valve, per se shown in Fig. 1.

Fig. 4 is a fragmentary plan view of a portion of Fig. 3.

Fig. 5 is an end elevational view of Fig. 3, seen from the left hand end.

Fig. 6 is an enlarged transverse sectional view taken on the line 6—6 of Fig. 3.

Fig. 7 is an enlarged detailed fragmentary view of a portion of Fig. 2.

The rotatable valve is shown used in combination with a combustion engine 10 having a plurality of adjacent cylinders 11, a cylinder head 12 with a bushing 13 on said cylinders and formed with gas passages 14 and 15 to said cylinders. The rotatable valve consists of a valve 16 rotatable in said bushing 13 for controlling the passages 14 and 15 of gases to and from the cylinders 11 and extending at one end 17, and means connected with said extended end 17 for driving said valve 16. The said valve 16 comprises a solid cylindrical member 18 with semi-cylindrical movable portions 19 and gaskets 20 along one side and spaced from each other, an arbor 21 coaxially extending thru said solid cylindrical member 18 and projecting from said extended end 17, eccentrics 22 on said arbor 21 within hollows 23 in said valve 16, brackets 24 connecting said eccentrics 22 and movable portions 19 for adjustments of the diameter of said valve 16 by changes in the compression of the gaskets 20 upon changes in the rotative position of said arbor 21, and coacting means on the extended end of said valve and arbor for holding the arbor in various rotative positions.

The combustion engine 10 may be of any design and construction and is shown to consist of a crank shaft 25 rotatively mounted in a crank casing 26. Connecting rods 27 connect with the crank shaft and with pistons 28 slidably mounted within the cylinders 11. The bushing 13 extends across the tops of all of the cylinders 11 and is formed with oil grooves 29 capable of coacting with similar grooves 30 formed upon the valve 16. The cylinder head 12 includes water chambers 31 arranged on opposite sides of the valve 16 so as to cool the valve while in operation.

The passages 14 constitute the inlet to the cylinders and the passages 15 the exhaust. The valve 16 is formed with ports 32 capable of connecting the different passages or cutting off the passages from the cylinders for the operation of the engine in conventional fashion. The ports 32 are arranged at different angles thru the valve 16 as may be seen from an inspection of Fig. 3 so as to compensate for the different phases in which the various pistons 28 within the cylinder 11, are in. The means connected with said extended end 17 of the valve for driving the valve consists of a bevel gear 33 attached upon the valve and meshing with a bevel pinion 34 upon a spindle 35 rotatively supported upon the casing of the engine 10. Another bevel gear 36 is attached upon the spindle 35 and meshes with a bevel pinion 37 upon the crank shaft 25. Thus rotations of the crank shaft are transmitted to the valve for driving the valve at the proper speed relative to the speed of the crank shaft.

The cylindrical member 18 is formed with a thrust collar 38 engageable by a thrust cap 39 for rotatively holding the valve against longitudinal movements. There is a movable portion 19 for each of the cylinders 11 as shown on the drawing. The ports 32 are arranged so as to partially extend thru the movable portion and the main portion 18 of the cylindrical member. The movable portions 19 are substantially one half of the valve at the particular sections where they occur. Pegs 40 project from the cylindrical member 18 and engage within apertures formed in the movable sections 19 so that the movable sections may move outwards relative to the main portion of the valve. The gaskets 20 are arranged between the movable sections and the main portion of the valve so as to prevent leakage of gas between these parts.

The brackets 24 encircle the eccentrics 22 and are provided with feet portions 41 engaged by screws 42 for connecting the brackets upon the movable portions 19. The coacting means on the extended end 17 of the valve 16 and arbor 21 for holding the arbor in various rotative positions consists of a large gear 43 fixed upon the arbor 21 and meshing with a pinion 44 rotatively mounted upon the extended end 17. A spring pressed pawl 45 is mounted upon the valve 16 and engages the pinion 44 for maintaining various rotative positions of the pinion. A square projection 46 extends from the pinion 44 and is intended for engagement with a turning tool for transmitting rotations to the arbor 21.

The cycle of operation of the engine is conventional and need not be explained. It will be sufficient to point out that the revolvable valve 16 works within the bushing 13 which is fixed within the cylinder head and is provided with necessary ports for connecting with the ports 14 and 15 so that when the valve rotates, proper passages of the gases are obtained. An oiling system is advisable for the lubrication of the valve and should include the grooves 29 and 30.

For efficient operation of the engine it is necessary that the valve be tight within the bushing and at the same time not too tight so as to cause excessive friction and wear. Accordingly, a tool may be engaged upon the square projection 46 of the pinion 44 and the pinion turned for turning the gear 43 for slightly turning the arbor 21 in one or the other directions so as to cause the eccentrics 22 to draw the movable portions 19 inwards or move them slightly outwards. The gaskets 20 serve to compensate for the very slight adjustments of the movable portions. Such slight adjustments are sufficient to make proper settings of the valve so that the most efficient operation is obtainable. After completion of the adjustments, the spring pressed pawl 45 engages the pinion 44 for maintaining the adjusted positions of the portions 19.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a combustion engine having a plurality of adjacent cylinders, a cylinder head with a bushing and on said cylinders and formed with gas passages to said cylinders, a valve revolvable in said bushing for controlling the passage of gases to and from said cylinders and extending at one end, means connected with said extended end for driving said valve, said valve comprising a solid cylindrical member with semi-cylindrical movable portions and gaskets along one side and spaced from each other, an arbor coaxially extending through said solid cylindrical member and projecting from said extended end, eccentrics on said arbor within hollows in said valve, brackets connecting said eccentrics and movable portions for adjustments of the diameter of said valve by changes in the compression of said gaskets upon changes in the rotative position of said arbor, and coacting means on the extended end of said valve and arbor for holding the arbor in various rotative positions.

2. In combination with a combustion engine having a plurality of adjacent cylinders, a cylinder head with a bushing and on said cylinders and formed with gas passages to said cylinders, a valve revolvable in said bushing for controlling the passage of gases to and from said cylinders and extending at one end, means connected with said extended end for driving said valve, said valve comprising a solid cylindrical member with semi-cylindrical movable portions and gaskets along one side and spaced from each other, an arbor coaxially extending through said solid cylindrical member and projecting from said extended end, eccentrics on said arbor within hollows in said valve, brackets connecting said eccentrics and movable portions for adjustments of the diameter of said valve by changes in the compression of said gaskets upon changes in the rotative position of said arbor, and coacting means on the extended end of said valve and arbor for holding the arbor in various rotative positions, said gaskets being positioned between the movable portions of the cylindrical member and capable of slight expansion and compression for preventing leakage of gases thru the valves upon adjustments of the diameter of the valve.

3. In combination with a combustion engine having a plurality of adjacent cylinders, a cylinder head with a bushing and on said cylinders and formed with gas passages to said cylinders, a valve revolvable in said bushing for controlling the passage of gases to and from said cylinders and extending at one end, means connected with said extended end for driving said valve, said valve comprising a solid cylindrical member with semi-cylindrical movable portions and gaskets along one side and spaced from each other, an arbor coaxialy extending through said solid cylindrical member and projecting from said extended end eccentrics on said arbor within hollows in said valve, brackets connecting said eccentrics and movable portions for adjustments of the diameter of said valve by changes in the compression of said gaskets upon changes in the rotative position of said arbor, and coacting means on the extended end of said valve and arbor for holding the arbor in various rotative positions, said brackets encircling said eccentrics and provided with feet portions engaged by screws for accomplishing the attachment upon the movable portions.

4. In combination with a combustion engine having a plurality of adjacent cylinders, a cylinder head with a bushing and on said cylinders and formed with gas passages to said cylinders, a valve revolvable in said bushing for controlling the passage of gases to and from said cylinders and extending at one end, means connected with said extended end for driving said valve, said valve comprising a solid cylindrical member with semi-cylindrical movable portions and gaskets along one side and spaced from each other, an arbor coaxially extending through said solid cylindrical member and projecting from said extended end, eccentrics on said arbor within hollows in said valve, brackets connecting said eccentrics and movable portions for adjustments of the diameter of said valve by changes in the compression of said gaskets upon changes in the rotative position of said arbor, and coacting means on the extended end of said valve and arbor for holding the arbor in various rotative positions, comprising a gear attached upon the extended end of the arbor and meshing with a pinion rotatively mounted upon the valve, and a spring urged pawl for normally holding the pinion against rotation.

5. In combination with a combustion engine having a plurality of adjacent cylinders, a cylinder head with a bushing and on said cylinders and formed with gas passages to said cylinders, a valve revolvable in said bushing for controlling the passage of gases to and from said cylinders and extending at one end, means connected with said extended end for driving said valve, said valve comprising a solid cylindrical member with semi-cylindrical movable portions and gaskets along one side and spaced from each other, an arbor coaxially extending through said solid cylindrical member and projecting from said extended end, eccentrics on said arbor within hollows in said valve, brackets connecting said eccentrics and movable portions for adjustments of the diameter of said valve by changes in the compression of said gaskets upon changes in the rotative position of said arbor, coacting means on the extended end of said valve and arbor for holding the arbor in various rotative positions, and pegs projecting from said cylindrical members and engaging in apertures in said movable portions.

6. In combination with a combustion engine having a plurality of adjacent cylinders, a cylinder head with a bushing and on said cylinders and formed with gas passages to said cylinders, a valve revolvable in said bushing for controlling the passage of gases to and from said cylinders and extending at one end, means connected with said extended end for driving said valve, said valve comprising a solid cylindrical member with semi-cylindrical movable portions and gaskets along one side and spaced from each other, an arbor coaxially extending through said solid cylindrical member and projecting from said extended end, eccentrics on said arbor within hollows in said valve, brackets connecting said eccentrics and movable portions for adjustments of the diameter of said valve by changes in the compression of said gaskets upon changes in the rotative positions of said arbor, and coacting means on the extended end of said valve and arbor for holding the arbor in various rotative positions, comprising a gear fixed upon the arbor; and means on the valve for engaging the gears for holding it in various adjusted positions.

In testimony whereof I have affixed my signature.

KURT PETER.